US007691930B2

(12) United States Patent
Inoue et al.

(10) Patent No.: US 7,691,930 B2
(45) Date of Patent: Apr. 6, 2010

(54) NON-CROSSLINKED FLAME-RETARDANT RESIN COMPOSITION, AND AN INSULATED WIRE AND A WIRING HARNESS USING THE SAME

(75) Inventors: Masato Inoue, Yokkaichi (JP); Mamoru Kondo, Yokkaichi (JP); Masashi Sato, Yokkaichi (JP); Tatsuya Hase, Yokkaichi (JP); Hiroshi Hayami, Osaka (JP); Osamu Ohama, Osaka (JP); Masuo Iida, Osaka (JP)

(73) Assignees: Autonetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 1080 days.

(21) Appl. No.: 10/558,381

(22) PCT Filed: Jun. 3, 2004

(86) PCT No.: PCT/JP2004/008083

§ 371 (c)(1), (2), (4) Date: Feb. 22, 2006

(87) PCT Pub. No.: WO2004/108818

PCT Pub. Date: Dec. 16, 2004

(65) Prior Publication Data

US 2006/0194909 A1 Aug. 31, 2006

(30) Foreign Application Priority Data

Jun. 3, 2003 (JP) ............................ 2003-158038
Dec. 4, 2003 (JP) ............................ 2003-405360

(51) Int. Cl.
*C08K 3/22* (2006.01)

(52) U.S. Cl. ....................... 524/430; 524/257; 524/432; 524/433; 524/543

(58) Field of Classification Search ................. 524/430, 524/257, 432, 433, 543
See application file for complete search history.

(56) References Cited

U.S. PATENT DOCUMENTS

| | | | |
|---|---|---|---|
| 3,407,140 | A | 10/1968 | Chiddix et al. |
| 7,053,145 | B1 | 5/2006 | Tasaka et al. |
| 2002/0108772 | A1 | 8/2002 | Hase et al. |
| 2002/0111411 | A1 | 8/2002 | Hase et al. |
| 2002/0112875 | A1 | 8/2002 | Hase et al. |
| 2004/0079547 | A1 | 4/2004 | Rodway et al. |

FOREIGN PATENT DOCUMENTS

| | | | | |
|---|---|---|---|---|
| DE | 199 41 181 | A1 | | 5/2000 |
| EP | 0 437 096 | A2 | | 7/1991 |
| EP | 0 953 597 | B1 | | 11/1999 |
| JP | A 7-76640 | | | 3/1995 |
| JP | 09-095566 | A | | 4/1997 |
| JP | A 11-199721 | | | 7/1999 |
| JP | A 11-199722 | | | 7/1999 |
| JP | A 11-236472 | | | 8/1999 |
| JP | 11-335514 | A | | 12/1999 |
| JP | B2 3280099 | | | 2/2002 |
| JP | A 2002-324442 | | | 11/2002 |
| JP | A 2003-082172 | | | 3/2003 |
| JP | 2003082172 | | * | 3/2009 |
| WO | WO 02/073631 | | * | 9/2002 |
| WO | WO 02/073631 | A1 | | 9/2002 |

* cited by examiner

*Primary Examiner*—Robert D. Harlan
(74) *Attorney, Agent, or Firm*—Oliff & Berridge, PLC

(57) ABSTRACT

To provide a non-crosslinked flame-retardant resin composition delivering excellent heat resistance without deteriorating over a long period of time, as well as possessing sufficient flame retardancy, mechanical properties, flexibility and workability, and an insulated wire and a wiring harness using the same. The non-crosslinked flame-retardant resin composition includes (B) a metallic hydrate, (C) a hindered phenolic antioxidant, (D) a sulfurous antioxidant, and (E) a metallic oxide in (A) a non-crosslinked base resin which includes a propylene resin containing 50 wt % or more of propylene monomer. It is preferable to utilize an imdazole compound as the ingredient (D) and an oxide of zinc as the ingredient (E). In addition, the composition is used as an insulated covering material for a non-halogenous insulated wire, which is used in a wire bundle of the wiring harness.

13 Claims, No Drawings

NON-CROSSLINKED FLAME-RETARDANT RESIN COMPOSITION, AND AN INSULATED WIRE AND A WIRING HARNESS USING THE SAME

TECHNICAL FIELD

The present invention relates to a non-crosslinked flame-retardant resin composition, and an insulated wire and a wiring harness using the same, and more specifically relates to a non-crosslinked flame-retardant resin composition, and an insulated wire and a wiring harness using the same, which are suitable for an insulated covering material for an insulated wire used in parts for a car such as an automobile, electric/electronic equipment, and the like.

BACKGROUND ART

Conventionally, for an insulated covering material for an insulated wire used in carrying out wiring of parts for a car such as an automobile, electric/electronic equipment and the like, generally in wide use is a vinyl chloride resin excellent in flame retardancy, into which additives such as a plasticizer and a stabilizer are blended as appropriate, and adjustments are made to types and blending amounts of these additives according to a variety of required properties including mechanical properties such as wear resistance, tensile strength and tensile elongation, flexibility, and workability.

However, there is a problem that the vinyl chloride resin, having flame retardancy by itself, includes halogen elements in its molecular chains, so that it emits harmful halogenous gas into the atmosphere in case of car fire or at the time of combustion for disposing of electric/electronic equipment by incineration, causing environmental pollution.

Under these circumstances, developed these days has been a so-called non-halogenous flame-retardant resin composition, which is prepared by using polyethylene, polypropylene or the like as its base resin and adding a metallic hydrate such as magnesium hydroxide as a flame retardant; however, there is a disadvantage that mechanical properties such as wear resistance remarkably degrade since the non-halogenous flame-retardant resin composition requires a large amount of metallic hydrate to be added thereto as the flame retardant.

Thus, in order to overcome such a disadvantage, for example, Japanese Patent Gazette No. 3280099 discloses an art to use a plurality of polyolefin resins and rubbers as the base resin, in which a specific functional group is further contained by a specific amount, so as to increase an affinity between the base resin and the metallic hydrate to improve the mechanical properties such as wear resistance.

However, the conventionally-known non-halogenous flame-retardant resin composition is turned out to cause problems as described below in a case where it is used as an insulated covering material for an insulated wire while possessing flame retardancy, mechanical properties, flexibility, workability and heat resistance.

Generally, in the case of using the insulated wire in a car such as an automobile, it is often the case that a plurality of insulated wires are tied in a bundle to be made into a wire bundle, around which a protective material in various shapes such as a tape, tube or sheet is wound to be utilized as a wiring harness.

At this time, as the insulated wires making up the wiring harness, not only non-halogenous insulated wires in which non-halogenous flame-retardant resin compositions are used as insulated covering materials are used, but also vinyl chloride insulated wires and the like in which vinyl chloride resin compositions such as polyvinyl chloride are used as insulated covering materials are abundantly used, empirically.

Therefore, the situation is such that mixed use of the non-halogenous insulated wires and the vinyl chloride insulated wires is difficult to completely avoid; however, use of the non-halogenous insulated wires in contact with the vinyl chloride insulated wires and the like under such a situation is turned out to cause a problem of remarkably deteriorating the insulated covering material for the non-halogenous insulated wires in the wire bundle to degrade its heat resistance.

Further, since the vinyl chloride resin composition and the like are usually used as a base material for the wiring-harness protective material wound around the wire bundle, use of the non-halogenous insulated wire in contact with a vinyl-chloride wiring-harness protective material and the like is turned out to cause the same problem.

The causes of the problems are not found in a detailed mechanism, however, the problems are assumably caused because an antioxidant in the insulated covering material consisting of the non-halogenous flame-resistant resin composition is remarkably consumed, or the antioxidant itself makes a transition into the vinyl chloride insulated wire or the vinyl-chloride wiring-harness protective material when the vinyl chloride insulated wire, the vinyl-chloride wiring-harness protective material or the like comes into contact with the non-halogenous insulated wire. At any rate, there is a need to immediately solve these problems concerning deterioration.

Consequently, the present invention has been made in view of the above circumstances and has an object to overcome the above problems and to provide a non-crosslinked flame-retardant resin composition which possesses sufficient flame retardancy, mechanical properties, flexibility and workability, and also possesses excellent heat resistance without deteriorating over a long period of time.

In addition, another object of the invention is to provide a non-halogenous insulated wire in which the above-described non-crosslinked flame-retardant resin composition is used as an insulated covering material, and a wiring harness including the non-halogenous insulated wire.

DISCLOSURE OF THE INVENTION

To achieve the objects and in accordance with the purpose of the present invention, as embodied and broadly described herein, a non-crosslinked flame-retardant resin composition consistent with the present invention contains (B) a metallic hydrate, (C) a hindered phenolic antioxidant, (D) a sulfurous antioxidant and (E) a metallic oxide in (A) a non-crosslinked base resin which includes a propylene resin containing 50 wt % or more of propylene monomer.

Here, preferable blending amounts of the respective ingredients are, with respect to 100 part weight of (A) the non-crosslinked base resin, 30-200 part weight of (B) the metallic hydrate, 0.5-10 part weight of (C) the hindered phenolic antioxidant, 0.5-20 part weight of (D) the sulfurous antioxidant, and 0.5-20 part weight of (E) the metallic oxide.

In addition, (D) the sulfurous antioxidant is preferably an imidazole compound.

In addition, (E) the metallic oxide is preferably an oxide of at least one metal selected from zinc (Zn), aluminum (Al), magnesium (Mg), lead (Pb) and tin (Sn).

In addition, (B) the metallic hydrate is preferably magnesium hydroxide or aluminum hydroxide.

Meanwhile, a non-halogenous insulated wire consistent with the present invention includes a conductor covered with the non-crosslinked flame-retardant resin composition.

In addition, a wiring harness consistent with the present invention includes a single wire bundle consisting only of the non-halogenous insulated wires or a mixed wire bundle consisting at least of the non-halogenous insulated wires and vinyl chloride insulated wires, and a wiring-harness protective material for covering the wire bundle, in which a non-halogenous resin composition, a vinyl chloride resin composition or a halogenous resin composition other than the vinyl chloride resin composition is used as a base material.

The non-crosslinked flame-retardant resin composition consistent with the present invention, containing (B) the metallic hydrate, (C) the hindered phenolic antioxidant, (D) the sulfurous antioxidant and (E) the metallic oxide in (A) the non-crosslinked base resin which includes the propylene resin containing 50 wt % or more of propylene monomer, contributes to no emission of halogenous gas at the time of combustion, and allows excellent heat resistance without causing deterioration over a long period of time, as well as possesses sufficient flame retardancy, mechanical properties such as wear resistance, tensile strength and tensile elongation, flexibility and workability.

In addition, according to the non-halogenous insulated wire consistent with the present invention in which the above-described non-crosslinked flame-retardant resin composition is used as an insulated covering material, and the wiring harness consistent with the present invention in which the non-halogenous insulated wire is included in its wire bundle, they sufficiently deliver heat resistance over a long period of time since the insulated covering material does not remarkably deteriorate even in the case of using the non-halogenous insulated wire in contact with the vinyl chloride insulated wire in the wire bundle, with the vinyl-chloride wiring-harness protective material covering the wire bundle, or with a halogenous wiring-harness protective material other than the vinyl-chloride wiring-harness protective material.

Therefore, use of the non-halogenous insulated wire and the wiring harness consistent with the present invention in an environment close to a heat source such as surroundings of an auto engine may ensure high reliability over a long period of time.

BEST MODE FOR CARRYING OUT THE INVENTION

A detailed description of one preferred embodiment of the present invention will now be given. A non-crosslinked flame-retardant resin composition consistent with the present invention contains (B) a metallic hydrate, (C) a hindered phenolic antioxidant, (D) a sulfurous antioxidant, and (E) a metallic oxide in (A) a non-crosslinked base resin which includes a propylene resin containing 50 wt % or more of propylene monomer. Firstly, a description concerning the respective ingredients of the non-crosslinked flame-retardant resin composition consistent with the present invention is given.

In the present invention, the propylene resin in (A) the non-crosslinked base resin is the one which contains 50 wt % or more of propylene monomer. Here, the propylene resin may consist of the propylene monomer alone, or may contain one or more than one sort of monomers other than the propylene monomer as appropriate.

For those other monomers, named are ethylene, alpha-olefin (C3-C20), unconjugated polyene and the like.

For the alpha-olefin (C3-C20), named are propylene, 1-butene, 4-methyl-l-pentene, 1-hexene, 1-heptene, 1-octane, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene, and the like. In addition, for the above-described unconjugated polyene, named are dicyclopentadiene, ethylidenenorbornene and the like.

Besides, it is desirable for the above-described propylene resin to have a melt flow rate (MFR) within the range of 0.1-5.0 g/10 minutes when measured based on JIS K 6758 (measurement is performed at 230° C. under a load of 2.16 kg). In a case where the MFR is below 0.1 g/10 minutes, the resin composition demonstrates a tendency to degrade its fluidity, and in a case where the MFR is over 5 g/10 minutes, it demonstrates a tendency to degrade mechanical properties and the like.

For (B) the metallic hydrate which is utilized as a flame retardant in the present invention, specifically named are compounds having a hydroxyl group or crystalline water, such as magnesium hydroxide, aluminum hydroxide, zirconium hydroxide, hydrated magnesium silicate, hydrated aluminum silicate, magnesium carbonate and hydro talcite, which may be employed by one sort alone, or more than one sort in combination. Among them, the compounds especially preferable are magnesium hydroxide and aluminum hydroxide since they have a high degree of effectiveness in flame retardancy and heat resistance, and also have cost effectiveness.

At this time, it is desirable for the above-described magnesium hydroxide, aluminum hydroxide and the like to have an average particle size ($d_{50}$) within the range of 0.5-5.0 μm, though particle sizes of the metallic hydrates differ depending on the variety. This is because in a case where the average particle size is smaller than 0.5 μm, secondary cohesion between particles occurs to demonstrate a tendency to degrade the mechanical properties, and in a case where the average particle size is larger than 0.5 μm, the mechanical properties are degraded to demonstrate a tendency to give rise to surface roughness when used as an insulated covering material.

In addition, in the present invention, (B) the metallic hydrate may be subjected to surface finishing using a finishing agent such as a fatty acid, fatty-acid metallic salt, a silane coupling agent, and a titanate coupling agent. Besides, in the case of employing the metallic hydrate subjected to the surface finishing, a metallic hydrate which is previously subjected to the surface finishing using the finishing agent may be blended into the composition, or an unfinished metallic hydrate may be blended into the composition together with the finishing agent to be subjected to the surface finishing, which is not limited in particular.

In the present invention, for (C) the hindered phenolic antioxidant, named are pentaerythritol tetrakis [3-(3,5-di-tert-butyl-4-hydroxyphenyl) propionate]; thiodiethylenebis [3-(3,5-di-tert-butyl-4-hydroxyphenyl) propionate]; octadecyl-3-(3,5-di-tert-butyl-4-hydroxyphenyl) propionate; N,N'-hexane-1,6-diylbis [3-(3,5-di-tert-butyl-4-hydroxyphenyl propione amide)]; benzene propanoic acid, 3,5-bis(1,1-dimethylethyl)-4-hydroxy,C7-C9 side-chain alkyl ester; 2,4-dimethyl-6-(1-methyl pentadecyl) phenol; diethyl [[3,5-bis(1,1-dimethylethyl)-4-hydroxyphenyl]methyl]phosphonate; 3,3',3",5,5',5"-hexa-tert-butyl-a,a',a"-(mesitylene-2,4,6-triyl) tri-p-cresol; calcium diethylbis[[[3,5-bis (1,1-dimethylethyl)-4-hydroxyphenyl]methyl]phosphonate]; 4,6-bis (octylthiomethyl)-o-cresol; ethylenebis (oxyethylene) bis [3-(5-tert-butyl-4-hydroxy-m-tolyl) propionate]; hexamethylenebis [3-(3,5-di-tert-butyl-4-hydroxyphenyl) propionate; 1,3,5-tris (3,5-di-tert-butyl-4-hydroxybenzyl)-1,3,5-triazine-2,4,6(1H,3H,5H)-trione; 1,3,5-tris [(4-tert-butyl-3-hydroxy- 2,6-xylyl) methyl]-1,3,5-triazine-2,4,6 (1H,3H,5H)-trione; 2,6-tert-butyl-4-(4,6-bis (octylthio)-1,3,5-triazine-2-ylamino) phenol; 2,6-di-tert-butyl-4-methylphenol; 2,2'-methylenebis (4-methyl-6-tert-butylphenol); 4,4'-butylidenebis (3-methyl-6-tert-butylphenol); 4,4'-thiobis (3-methyl-6-tert-butylphenol); 3,9-bis [2-(3-(3-tert-butyl-4-hydroxy-5-methylphenyl))-1, 1-dimethylethyl]-2,4,8,10-tetraoxaspiro (5,5) undecane; and the like, which may be employed by one sort alone, or more than one sort in combination.

In the present invention, for (D) the sulfurous antioxidant, named are an imidazole compound, a thiazole compound, a sulfenamid compound, a thiuram compound, a dithiocarbamate compound, a xanthate compound and the like, which may be employed by one sort alone, or more than one sort in combination. Besides, the imidazole compound referred to in the present invention includes an atom of sulfur (S).

For the above-describe imidazole compound, named are 2-mercaptobenzimidazole, 2-mercaptomethylbenzimidazole, 4-mercaptomethylbenzimidazole, 5-mercaptomethylbenzimidazole and the like, and zinc salts thereof.

In addition, for the above-described thiazole compound, named are 2-mercaptobenzthiazole; di-2-benzthiazole disulfide; zinc salt of 2-mercaptobenzthiazole; cyclohexylamine salt of 2-mercaptobenzthiazole; 2-(N,N-diethylthiocarbamoylthio)benzthiazole; 2-(4'-molpholinodithio)benzthiazole; and the like.

In addition, for the above-described sulfenamid compound, named are N-cyclohexyl-2-benzthiazolesulfenamid; N-tert-butyl-2-benzthiazolesulfenamid; N-oxydiethylene-2-benzthiazolesulfenamid; N,N-diisopropyl-2-benzthiazolesulfenamid; N,N'-dicyclohexyl-2-benzthiazolesulfenamid; and the like.

In addition, for the above-described thiuram compound, named are tetramethylthiuram monosulfide, tetramethylthiuram disulfide, tetraethylthiuram disulfide, tetrabutylthiuram disulfide, dipentamethylenethiuram tetrasulfide, tetrakis(2-ethylhexyl)thiuramdisulfide, and the like.

In addition, for the above-described dithiocarbamate compound, named are zinc dimethyldithiocarbamate, zinc diethyldithiocarbamate, zinc-di-n-butyldithiocarbamate, zinc-N-ethyl-N-phenyldithiocarbamate, zinc-N-pentamethylenedithiocarbamate, zinc dibenzyldithiocarbamate, and the like.

In addition, for the above-described xanthate compound, named are sodium isopropyl xanthate, zinc isopropyl xanthate, zinc butyl xanthate, and the like.

Among the above-described sulfurous antioxidants, the imidazole compound is especially preferable.

In the present invention, for (E) the metallic oxide, named are an oxide of a metal such as zinc (Zn), aluminum (Al), magnesium (Mg), lead (Pb) and tin (Sn), an oxide of an alloy of the above-described metals, and the like, which may be employed by one sort alone, or more than one sort in combination. Among these oxides, the oxide of zinc (Zn) is especially preferable.

In the present invention, preferable blending amounts of the above-described respective ingredients (A)-(E) are, with respect to 100 part weight of (A) the non-crosslinked base resin, 30-200 part weight of (B) the metallic hydrate, 0.5-10 part weight of (C) the hindered phenolic antioxidant, 0.5-20 part weight of (D) the sulfurous antioxidant, and 0.5-20 part weight of (E) the metallic oxide.

At this time, it is not preferable for the blending amount of (B) the metallic hydrate to be less than 30 part weight since a tendency that sufficient flame retardancy is not obtained is demonstrated, and to be more than 200 part weight since a tendency that sufficient mechanical properties are not obtained is demonstrated.

In addition, it is not preferable for the blending amount of (C) the hindered phenolic antioxidant to be less than 0.5 part weight since a tendency that sufficient heat resistance is not obtained is demonstrated, and to be more than 10 part weight since a tendency that its blending effect becomes saturated as well as a tendency that an additive exudes to the surface of the composition during use are demonstrated.

In addition, it is not preferable for the blending amount of (D) the sulfurous antioxidant to be less than 0.5 part weight since a tendency that sufficient heat resistance is not obtained is demonstrated, and to be more than 20 part weight since a tendency that its blending effect becomes saturated as well as a tendency that an additive exudes to the surface of the composition during use are demonstrated.

In addition, it is not preferable for the blending amount of (E) the metallic oxide to be less than 0.5 part weight since a tendency that sufficient heat resistance is not obtained is demonstrated, and to be more than 20 part weight since a tendency that its blending effect becomes saturated as well as a tendency that sufficient mechanical properties are not obtained are demonstrated.

While the detailed description regarding the essential ingredients (A)-(E) of the present invention is given as above, as an arbitrary resin ingredient, polyolefin or a rubber may be additionally used in the non-crosslinked flame-retardant resin composition consistent with the present invention as appropriate. For the polyolefin, named are low-density polyethylene by a high-pressure radical polymerization method; ethylene-alpha-olefin copolymer; ethylene-vinylester copolymer; ethylene-alpha, beta-unsaturated carboxylic acid alkyl ester copolymer; and the like. In addition, for the rubber, named are an ethylenepropylene rubber, a butadiene rubber, an isoprene rubber, a crude rubber, a nitrile rubber, an isobutylene rubber, and the like. These polyolefin and rubbers may be used alone or in combination.

For alpha-olefin copolymer used for the above-described ethylene-alpha-olefin copolymer, the one obtained by a low/moderate pressure process using Ziegler catalyst, single-site catalyst or the like, or other known processes is utilized, and for alpha-olefin, named are ethylene and alpha-olefin (C3-20), and more specifically, propylene, 1-butene, 1-hexene, 1-hepten, 1-octane, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene, and the like.

For vinylester monomer used for the above-described ethylene-vinylester copolymer, named are vinyl propionate, vinyl acetate, vinyl caproate, vinyl caprylate, vinyl laurate, vinyl stearate, vinyl trifluoroacetate, and the like.

For alpha, beta-unsaturated carboxylic acid alkyl ester-monomerused for the above-describedethylene-alpha, beta-unsaturated carboxylic acid alkyl ester copolymer, named are methyl acrylate, methyl methacrylate, ethyl acrylate, ethyl methacrylate, and the like.

For the above-described ethylenepropylene rubber, named are random copolymer which is mainly composed of ethylene and propylene, random copolymer which is mainly composed of the above-described copolymer to which diene monomer such as dicyclopentadiene and ethylidenenorbornene is added as a third ingredient, and the like.

For the above-described butadiene rubber, which is copolymer containing butadiene as a component, named are styrene-butadiene block copolymer; styrene-ethylene-butadiene-styrene copolymer which is a hydrogenerated or partially-hydrogenerated derivative of the styrene-butadiene block copolymer; 1,2-polybutadiene; maleic-anhydride modified styrene-ethylene-butadiene-styrene copolymer; a modified butadiene rubber with a core-shell structure; and the like.

For the above-described isoprene rubber, which is copolymer containing isoprene as a component, named are styrene-isoprene block copolymer, styrene-ethylene-isoprene-styrene copolymer which is a hydrogenerated or partially-hydrogenerated derivative of the styrene-isoprene block copolymer, maleic-anhydride modified styrene-ethylene-isoprene-styrene copolymer, a modified isoprene rubber with a core-shell structure, and the like.

At this time, the above-described polyolefin or rubber is applied up to the order of 100 part weight with respect to 100 part weight of (A) the non-crosslinked base resin since a tendency to degrade mechanical properties and the like is unfavorably demonstrated when applied more than 100 part weight.

Additionally, in the non-crosslinked flame-retardant resin composition consistent with the present invention, other additives may be blended as appropriate insofar as physical properties of the composition are not impaired. Specifically, additives and the like which are generally used for a resin molding material such as an inorganic filler, antioxidants other than the above-described antioxidants, a metal deactivator (copper inhibitor), an ultraviolet absorber, an ultraviolet-concealing agent, a flame-retardant auxiliary agent, a processing aid (lubricant, wax and the like), and carbon and other coloring pigments may be blended, and are not limited in particular hereto.

For example, blending the inorganic filler as the additive allows the blending amount of (B) the metallic hydrate being the flame retardant to be decreased, and allows other properties to be provided. For the inorganic filler, specifically named are calcium sulfate, calcium silicate, clay, diatomaceous earth, talc, silicate sand, glass powder, iron oxide, graphite, silicon carbide, siliconnitride, silica, boron nitride, aluminum nitride, carbon black, mica, a glass plate, sericite, pyrophyllite, Shirasu-balloon, glass balloon, pumice, glass fiber, carbon fiber, whisker, graphite fiber, silicon carbide fiber, asbestos, wallastonite, and the like.

Additionally, as for the non-crosslinked flame-retardant resin composition consistent with the present invention, a functional group which is generally used to improve various physical properties may be introduced to its non-crosslinked base resin since it does not impair the flame retardancy and heat resistance being the essential properties of the present invention. For the specific functional group, named are a carboxylic acid group, an acid anhydrous group, an epoxy group, a hydroxyl group, an amino group, alkenyl cyclic imino ether group, a silane group, and the like.

A production process of the above-described non-crosslinked flame-retardant resin composition consistent with the present invention is not limited in particular, and a publicly known production process may be adopted. For example, the composition may be obtained by blending the essential ingredients (A)-(E), and the above-described arbitrary resin ingredient and additives as appropriate, and dry-blending them with the use of a regular tumbler and the like, or melting and kneading them to disperse uniformly with the use of a regular kneader such as a Banbury mixer, a pressure kneader, a kneading extruder, a twin-screw extruder and a roll.

Next, a detailed description is given to the effect of the non-crosslinked flame-retardant resin composition consistent with the present invention.

The non-crosslinked flame-retardant resin composition with the above-described constitution, which contains (B) the metallic hydrate, (C) the hindered phenolic antioxidant, (D) the sulfurous antioxidant, and (E) the metallic oxide in (A) the non-crosslinked base resin which includes the propylene resin containing 50 wt % or more of propylene monomer, contributes to no emission of halogenous gas at the time of combustion and allows excellent heat resistance without causing deterioration over a long period of time, as well as possesses sufficient flame retardancy, mechanical properties such as wear resistance, tensile strength and tensile elongation, flexibility and workability. Here, as long as the respective ingredients are blended within the above-described specific ranges, the respective properties are excellent in balance.

Especially in a case where the non-crosslinked flame-retardant resin composition is used as an insulated covering material for non-halogenous insulated wires which are used in contact with vinyl chloride insulated wires in a wire bundle, or with a vinyl-chloride wiring-harness protective material covering the wire bundle, the insulated covering material for the non-halogenous insulated wires does not remarkably deteriorate over a long period of time, delivering heat resistance sufficiently.

Here, a matter of great import in the present invention is that (C) the hindered phenolic antioxidant, (D) the sulfurous antioxidant and (E) the metallic oxide are contained in sets in (A) the non-crosslinked base resin including the propylene resin which contains (B) the metallic hydrate.

In other words, the above-described advantage unique to the present invention is not produced even in a case where the two ingredients of (C) the hindered phenolic antioxidant and (D) the sulfurous antioxidant are contained in (A) the non-crosslinked base resin which contains (B) the metallic hydrate, not to speak of (C) the hindered phenolic antioxidant contained therein alone, but produced only in a case where the three ingredients of (C) the hindered phenolic antioxidant, (D) the sulfurous antioxidant and (E) the metallic oxide are contained therein.

Concerning this matter, it is conventionally known that using a phenolic antioxidant and the sulfurous antioxidant in combination for a rubber material brings about a synergistic effect to performance at the time of use at a high temperature. However, in the non-crosslinked base resin including the propylene resin consistent with the present invention, which has a totally different molecular structure, the synergistic effect shown in the rubber material is not expected at all only by using (C) the hindered phenolic antioxidant and (D) the sulfurous antioxidant in combination.

On the other hand, if (E) the metallic oxide is present in the base resin further to (C) the hindered phenolic antioxidant and (D) the sulfurous antioxidant even in the case of the non-crosslinked base resin including the propylene resin, the material does not deteriorate apparently over a long period of time and the heat resistance is improved.

Therefore, as for the non-crosslinked flame-retardant resin composition consistent with the present invention, though a detailed mechanism is not found yet, it is assumed that (E) the metallic oxide acts as a catalyst for (D) the sulfurous antioxidant, allowing a synergistic effect and the like to be produced by (C) the hindered phenolic antioxidant and (D) the sulfurous antioxidant also in the non-crosslinked base resin including the propylene resin, so that the above-described advantage unique to the present invention is produced.

Next, a description is given to constitution of a non-halogenous insulated wire and a wiring harness consistent with the present invention.

The non-halogenous insulated wire consistent with the present invention is a wire in which the above described non-crosslinked flame-retardant resin composition is used as an insulated covering material. For the constitution of the non-halogenous insulated wire, a conductor may be directly covered with the insulated covering material, or another intermediate material such as a shielded conductor and another insulator may be interposed between the conductor and the insulated covering material.

In addition, the diameter, material and the like of the conductor are not limited in particular, which may be determined appropriately as usage. The thickness of the insulated covering material is neither limited in particular, and may be determined appropriately considering the conductor diameter and the like.

As for a production process of the above-described non-halogenous insulated wire, it may be produced by extrusion-covering, with the use of a generally-used extrusion molding machine and the like, the conductor with the non-crosslinked flame-retardant resin composition consistent with the present invention which is obtained by melting and kneading with the use of the generally-used kneader such as a Banbury mixer, a pressure kneader and a roll, and the process is not limited in particular.

On the other hand, the wiring harness consistent with the present invention is prepared by covering a single wire bundle consisting only of the above-described non-halogenous insulated wires, or a mixed wire bundle consisting at least of the above-described non-halogenous insulated wires and vinyl chloride insulated wires, with a wiring-harness protective material.

Here, the vinyl chloride insulated wire referred to in the present invention employs a vinyl chloride resin composition as an insulated covering material. Here, a vinyl chloride resin refers to a resin mainly composed of vinyl chloride monomer, and this resin may be homopolymer of vinyl chloride, or copolymer with another monomer. For the specific vinyl chloride resin, named are polyvinyl chloride, ethylene-vinyl chloride copolymer, propylene-vinyl chloride copolymer, and the like.

Incidentally, descriptions about constitution of the vinyl chloride insulated wire other than the insulated covering material, and a production process of the wire are omitted since they are almost the same as those of the above-described non-halogenous insulated wire.

In addition, the single wire bundle referred to in the present invention is a wire bundle made by tying only the above-described non-halogenous insulated wires into a bundle, while the mixed wire bundle, which includes at least the above-described non-halogenous insulated wires and the vinyl chloride insulated wires, is a wire bundle made by tying these mixed insulated wires into a bundle. At this time, the numbers of the wires included in the single wire bundle and the mixed wire bundle, respectively, may be determined arbitrarily, which are not limited in particular.

In addition, the wiring-harness protective material referred to in the present invention covers the wire bundle made by tying plural numbers of insulated wires, so as to play a role in protecting the inside wire bundle from an external environment and the like.

In the present invention, used as a base material constituting the wiring-harness protective material is a non-halogenous resin composition, a vinyl chloride resin composition, or a halogenous resin composition other than the vinyl chloride resin composition.

Utilized as the non-halogenous resin composition may be a polyolefin flame-retardant resin composition which is prepared by adding various additives such as a non-halogenous flame retardant to polyolefin such as polyethylene, polypropylene and propylene-ethylene copolymer, the above-described non-crosslinked flame-retardant resin composition consistent with the present invention, or the like.

In addition, utilized as the vinyl chloride resin composition may be the one described above as the vinyl chloride insulated wire material.

In addition, for the halogenous resin composition other than the vinyl chloride resin composition, named is a composition which is made by adding various additives such as a halogenous flame retardant to the above-described polyolefin and the like.

Besides, these resin compositions used as the base materials may be cross-linked by a cross-linking agent such as a silane cross-linking agent, by electron radiation or the like, as appropriate.

In addition, as the wiring-harness protective material, one having a tape-shaped base material at least one side of which an adhesive is applied on, one having a base material which is tube-shaped, sheet-shaped or the like may be selected to be utilized appropriately as usage.

Incidentally, the wiring harness consistent with the present invention includes the following wiring harnesses made of the variety of the above-described wire bundles and the variety of the above-described wiring-harness protective materials in varying combinations.

More specifically, the wiring harness consistent with the present invention includes one which is made by covering the single wire bundle consisting only of the non-halogenous insulated wires with the vinyl-chloride wiring-harness protective material, one which is made by covering the single wire bundle consisting only of the non-halogenous insulated wires with the non-halogenous wiring-harness protective material, one which is made by covering the single wire bundle consisting only of the non-halogenous insulated wires with the halogenous wiring-harness protective material, one which is made by covering the mixed wire bundle consisting at least of the non-halogenous insulated wires and the vinyl chloride insulated wires with the vinyl-chloride wiring-harness protective material, one which is made by covering the mixed wire bundle consisting at least of the non-halogenous insulated wires and the vinyl chloride insulated wires with the non-halogenous wiring-harness protective material, and one which is made by covering the mixed wire bundle consisting at least of the non-halogenous insulated wires and the vinyl chloride insulated wires with the halogenous wiring-harness protective material.

Next, a description is given to the effect of the non-halogenous insulated wire and the wiring harness consistent with the present invention.

According to the non-halogenous insulated wire and the wiring harness in which the wire bundle includes the non-halogenous insulated wire, being consistent with the present invention, the insulated covering material does not remarkably deteriorate even when the non-halogenous insulated wire is used in contact with the vinyl chloride insulated wire in the wire bundle, or in contact with the vinyl-chloride wiring-harness protective material covering the wire bundle or with the halogenous wiring-harness protective material other than the vinyl-chloride wiring-harness protective material, so that the heat resistance is sufficiently delivered over a long period of time.

Therefore, use of the non-halogenous insulated wire and the wiring harness consistent with the present invention in an environment close to a heat source such as surroundings of an auto engine may ensure high reliability over a long period of time.

EXAMPLE

A description of the present invention will now be given specifically with reference to Examples, however, the present invention is not limited hereto.

(Test Material, Manufacturer, and the Like)

Test materials used in the Examples are given along with manufacturers, trade names, values of physical properties, and the like.

(A) Non-crosslinked Base Resin:

(a1) Polypropylene [manuf.: Idemitsu Petrochemical Co., Ltd., trade name: "E150GK", MFR=0.6 g/10 min.];

(a2) Polypropylene [manuf.: Japan Polychem Corporation, trade name: "BC8A", MFR=0.7 g/10 min.];

(a3) Polypropylene [manuf.: Idemitsu Petrochemical Co., Ltd., trade name: "J-750HP", MFR=14.0 g/10 min.]; and (a4) Polypropylene [manuf.: Dupont Dow Elastomers L.L.C., trade name: "Nordel IP4640", propylene content: 40%]

Besides, (a4) is not a propylene resin referred to in the present invention since it contains 40% propylene, however, it is classified as (A) the non-crosslinked base resin for convenience of description.

(B) Metallic Hydrate:

(b1) Magnesium hydroxide [manuf.: Martinswerk GmbH, trade name: "MAGNIFIN H10", average particle size: 1.0 μm];

(b2) Magnesium hydroxide [manuf.: Showa Denko K.K., trade name: "HIGILITE H42", average particle size: 1.0 μm];

(b3) Magnesium hydroxide [reagent, average particle size: 0.5 μm];

(b4) Magnesium hydroxide [reagent, average particle size: 5.0 μm];

(b5) Magnesium hydroxide [reagent, average particle size: 0.1 μm]; and (b6) Magnesium hydroxide [reagent, average particle size: 7.0 μm]

(C) Hindered Phenolic Antioxidant:

(c1) Manuf.: Ciba Specialty Chemicals Inc., trade name:. "Irganox 1010"

(D) Sulfurous Antioxidant:

(d1) 2-mercaptobenzimidazole [manuf.: Ouchishinko Chemical Industrial Co., Ltd., trade name: "NOCRAC MB"];

(d2) 2-mercaptomethylbenzimidazole [manuf.: Ouchishinko Chemical Industrial Co., Ltd., trade name: "NOCRAC MMB"]; and (d3) Zinc salt of 2-mercaptobenzimidazole [manuf.: Ouchishinko Chemical Industrial Co., Ltd., trade name: "NOCRAC MBZ"]

(E) Metallic Oxide:

(e1) Zinc oxide(zinc flower) [manuf.: Hakusui Tech Co., Ltd., trade name: "Zinc Oxide JIS2"]

Other Ingredients:

(x1) Manuf.: Asahi Kasei Chemicals Corporation, trade name: "Tuftec H1041";

(x2) Manuf.: Asahi Kasei Chemicals Corporation, trade name: "Tuftec M1913";

(x3) Manuf.: DuPont-Mitsui Polychemicals Co., Ltd., trade name: "HPR VR103"; and (y1) Manuf.: Ciba Specialty Chemicals Inc., trade name: "Irganox MD1024"

Besides, (x1)-(x3) are polyolefin or a rubber, and (y1) is a metal deactivator.

Vinyl Chloride Insulated wire Material and Wiring-Harness

Protective Material:

Polyvinyl chloride resin [manuf.: Toso Corporation, trade name: "4000M3", polymerization degree: 1300];

Diisononyl phthalate (DINP) [manuf.: Dainippon Ink and Chemicals Incorporated, trade name: "Monocizer DINP"];

Dioctyl Phthalate (DOP) [manuf.: Dainippon Ink and Chemicals Incorporated, trade name: "Monocizer DOP"];

Calcium carbonate heavy [manuf.: Maruo Calcium Co., Ltd., trade name: "Super #1700"];

Calcium-zinc stabilizer [manuf.: Sakai Chemical Industry Co., Ltd., trade name: "OW-800"];

Stylene butadiene rubber [manuf.: JSR Corporation, trade name: "1013N"];

Crude rubber [RSS #2];

Zinc Oxide [manuf.: Hakusui Tech Co., Ltd., trade name: "Zinc Oxide JIS2"]; and

Rosinous resin [manuf.: Arakawa Chemical Industries, Ltd., trade name: "Ester Gum H"]

(Preparation of Composition and Insulated Wire)

Firstly, by blending the respective ingredients shown in the below-described table at a mixing temperature of 25° C. with the use of a double-shaft kneader and pelletizing them with the use of a pelletizing machine, compositions consistent with the present Examples and compositions consistent with Comparative Examples were obtained. Then, by extrusion-covering conductors (cross sectional area: 0.5 $mm^2$), which were soft-copper twisted wires made by twisting seven soft copper wires together, with the obtained compositions to have a thickness of 0.28 mm with the use of a 50 mm extruder, non-halogenous insulated wires consistent with the present Examples and non-halogenous insulated wires consistent with the Comparative Examples were prepared.

Next, 100 part weight of polyvinyl chloride resin (polymerization degree: 1300) was blended with 40 part weight of DINP (diisononyl phthalate) as a platicizer, 20 part weight of calcium carbonate heavy as a filler, and 5 part weight of calcium-zinc stabilizer as a stabilizer at 180° C. with the use of an open roll and pelletized with the use of a pelletizing machine to be formed into polyvinyl chloride resin compounds. With the compounds, conductors (cross sectional area: 0.5 $mm^2$), which were soft-copper twisted wires made by twisting seven soft copper wires together were extrusion-covered with the use of a 50 mm extruder to have a thickness of 0.28 mm, and vinyl chloride insulated wires were prepared.

(Preparation of Wiring Harness)

Next, by using the obtained non-halogenous insulated wires consistent with the present Examples, the obtained non-halogenous insulated wires and vinyl chloride insulated wires consistent with the Comparative Examples, wiring harnesses were prepared. To be more specific, the wiring harnesses were prepared by making mixed wire bundles in which the arbitrary number of non-halogenous insulated wires and the arbitrary number of vinyl chloride insulated wires were mixed, and by winding adhesive-backed tapes around the bundles as wiring-harness protective materials.

At this time, the adhesive-backed tape was prepared such that an adhesive layer of 0.02 mm in thickness was provided as an adhesive all over a single surface of a base material consisting of polyvinyl chloride resin compounds, and the thickness of the entire adhesive-backed tape was made to be 0.13 mm. Here, the polyvinyl chloride resin compounds used as the material for the adhesive-backed tape were prepared by blending the polyvinyl chloride resin (polymerization degree: 1300) which was set to be 100 part weight with 60 part weight of DOP (dioctylphthalate) as a plasticizer, 20part weight of calcium carbonate heavy as a filler, and 5 part weight of calcium-zinc stabilizer as a stabilizer. In addition, the used adhesive was made by blending the styrene butadiene rubber which was set to be 70 part weight with 30 part weight of crude rubber, 20 part weight of zinc oxide, and 80 part weight of rosinous resin.

[Test Procedure]

The respective insulated wires prepared as above were subjected to a flame-retardancy test, a tensile-elongation test, a tensile-strength test, a wear-resistance test, a flexibility test, a workability test and a heat-resistance A test, while the insulated wires in the wiring harness were subjected to a heat-resistance B test. Hereinafter, descriptions will be given to respective test procedures and respective assessment procedures.

(Flame-retardancy Test)

The flame-retardancy test was performed based on JASO D611-94. To be more specific, the non-halogenous insulated wires were cut into test specimens 300 mm long, each of which was placed in an iron test box to be held horizontal, and the tip of a reducing flame by a Bunsen burner having a caliber of 10 mm was placed beneath the center of the test specimen within 30 seconds until it burned, and then, after the flame was calmly removed, an after flame time of the test specimen was measured. The test specimen whose after flame time was within 15 seconds was regarded as passed, and the one whose after flame time was over 15 seconds was regarded as failed.

(Tensile-elongation Test and Tensile-strength Test)

The tensile-elongation test and the tensile-strenght test were performed based on JASO D611-94. To be more specific, the non-halogenous insulated wires were cut into specimens 150 mm long, from which the conductors were removed to be made into tubular test specimens consisting only of the insulated covering materials, and then reference lines were marked at intervals of 50 mm along the center line. Next, at room temperatures of 23±5° C., the test specimen was attached by both ends to a chuck of a tensile tester to be pulled at a tensile speed of 200 mm/minute, and a load and a distance between the reference lines at the time when the test specimen was broken were measured. The test specimen whose tensile elongation was 125% or more was regarded as passed, and the one whose tensile elongation was below 125% was regarded as failed. Meanwhile, the test specimen whose tensile strength was 15.7 MPa or more was regarded as passed, and the one whose tensile strength was below 15.7 MPa was regarded as failed.

(Wear-resistance Test)

The wear-resistance test was performed by a blade-reciprocating method based on JASO D611-94. To be more specific, the non-halogenous insulated wires were cut into test specimens 750 mm long, and then at a room temperature of 25° C., a blade was made to reciprocate in a direction of its shaft over a length of 10 mm on a surface of the insulated covering material of each of the test specimens which was fixed to a table, and the number of reciprocation before the blade touches the conductor due to the wearing away of the insulated covering material was counted. At this time, a load imposed on the blade was set at 7N, and the blade was set to reciprocate at a speed of 50 times/minute. Then, the test specimen was moved by 100 mm and rotated 90 degrees clockwise, and the measurement as described above was repeated. The measurement was performed three times in total with respect to one test specimen, and the one whose smallest reciprocation number was 150 or more was regarded as passed, and the one whose smallest reciprocation number was below 150 was regarded as failed.

(Flexibility Test)

The flexibility test was performed by assessing the respective insulated wires by the touch when bending by hands. To be more specific, the one which had a good feel was regarded as passed, and the one which had a bad feel was regarded as failed.

(Workability Test)

The workability test was performed by checking whether fringes were formed or not when resin-covered parts at the ends of the respective covered wires were stripped off, and the one which did not form a fringe was regarded as passed and the one which formed a fringe was regarded as failed.

(Heat-resistance A Test)

In the heat-resistance A test, one of the non-halogenous insulated wires was subjected to aging at 150° C. for 72 hours, and then the wire was coiled to its own diameter. The one whose insulated covering material did not crack was regarded as passed and the one whose insulated covering material cracked was regarded as failed.

(Heat-resistance B Test)

In the heat-resistance B test, the wiring harness, to be more specific, the wiring harness made by winding the vinyl chloride adhesive tape around the mixed wire bundle in which the arbitrary number of non-halogenous insulated wires and the arbitrary number of vinyl chloride insulated wires were mixed, was subjected to aging at 150° C. for 72 hours, and then an arbitrary non-halogenous insulated wire was taken out from the mixed wire bundle and coiled to its own diameter. The one whose insulated covering material did not crack was regarded as passed and the one whose insulated covering material cracked was regarded as failed.

Besides, as for the compositions shown in Table 3, the presence and absence of bleed were also checked.

Ingredient constitution and assessment results of the compositions are shown in the following Tables 1-5.

TABLE 1

| | Example 1 | Example 2 | Comparative example 1 | Comparative example 2 |
|---|---|---|---|---|
| (A) Non-crosslinked base resin | | | | |
| (a1) E150GK | 100 | | | |
| (a2) BC8A | | 100 | | |
| (a3) J-750HP | | | 100 | |
| (a4) Nordel IP4640 | | | | 100 |
| (B) Metallic hydrate | | | | |
| (b1) MAGNIFIN H10 | 70 | 70 | 70 | 70 |

TABLE 1-continued

| | Example 1 | Example 2 | Comparative example 1 | Comparative example 2 |
|---|---|---|---|---|
| (C) Hindered phenolic antioxidant | | | | |
| (c1) Irganox 1010 | 3 | 3 | 3 | 3 |
| (D) Sulfurous antioxidant | | | | |
| (d1) NOCRAC MB | 5 | 5 | 5 | 5 |
| (E) Metallic oxide | | | | |
| (e1) Zinc Oxide JIS2 | 5 | 5 | 5 | 5 |
| Other ingredients | | | | |
| (x1) Tuftec H1041 | 10 | 10 | 10 | 10 |
| (y1) Irganox MD1024 | 1 | 1 | 1 | 1 |
| Flame retardancy | passed | passed | passed | passed |
| Tensile elongation (%) | 600 | 480 | 630 | 700 |
| Tensile strength (MPa) | 40 | 28 | 12 | 5 |
| Wear resistance (number of times) | 1000 | 650 | 100 | 10 |
| Flexibility | passed | passed | passed | passed |
| Workability | passed | passed | failed | failed |
| Heat resistance A | passed | passed | failed | failed |
| Heat resistance B (※) | passed | passed | failed | failed |
| ※ Non-halogenous insulated wire (number of wires) | 10 | 10 | 10 | 10 |
| ※ Vinyl chloride insulated wire (number of wires) | 20 | 20 | 20 | 20 |

TABLE 2

| | Example 3 | Example 4 | Example 5 | Example 6 | Example 7 | Comparative example 3 | Comparative example 4 | Comparative example 5 | Comparative example 6 |
|---|---|---|---|---|---|---|---|---|---|
| (A) Non-crosslinked base resin | | | | | | | | | |
| (a1) E150GK | 100 | 100 | 100 | 100 | 100 | 100 | 100 | 100 | 100 |
| (B) Metallic hydrate | | | | | | | | | |
| (b1) MAGNIFIN H10 | | 30 | 200 | | | 20 | 210 | | |
| (b2) HIGILITE H42 | 70 | | | | | | | | |
| (b3) Magnesium hydroxide | | | | 70 | | | | | |
| (b4) Magnesium hydroxide | | | | | 70 | | | | |
| (b5) Magnesium hydroxide | | | | | | | | 70 | |
| (b6) Magnesium hydroxide | | | | | | | | | 70 |
| (C) Hindered phenolic antioxidant | | | | | | | | | |
| (c1) Irganox 1010 | 3 | 3 | 3 | 3 | 3 | 3 | 3 | 3 | 3 |
| (D) Sulfurous antioxidant | | | | | | | | | |
| (d1) NOCRAC MB | 5 | 5 | 5 | 5 | 5 | 5 | 5 | 5 | 5 |
| (E) Metallic oxide | | | | | | | | | |
| (e1) Zinc Oxide JIS2 | 5 | 5 | 5 | 5 | 5 | 5 | 5 | 5 | 5 |
| Other ingredients | | | | | | | | | |
| (x2) Tuftec M1913 | 10 | 10 | 10 | 10 | 10 | 10 | 10 | 10 | 10 |
| (y1) Irganox MD1024 | 1 | 1 | 1 | 1 | 1 | 1 | 1 | 1 | 1 |
| Flame retardancy | passed | passed | passed | passed | passed | failed | passed | passed | passed |
| Tensile elongation (%) | 610 | 650 | 150 | 620 | 200 | 650 | 100 | 320 | 250 |
| Tensile strength (MPa) | 38 | 50 | 20 | 45 | 22 | 50 | 12 | 11 | 7 |
| Wear resistance (number of times) | 900 | 1300 | 250 | 1100 | 300 | 1300 | 100 | 120 | 80 |
| Flexibility | passed | passed | passed | passed | passed | passed | failed | passed | passed |
| Workability | passed | passed | passed | passed | passed | passed | failed | failed | failed |
| Heat resistance A | passed | passed | passed | passed | passed | passed | passed | failed | failed |
| Heat resistance B (※) | passed | passed | passed | passed | passed | passed | passed | failed | failed |
| ※ Non-halogenous insulated wire (number of wires) | 10 | 10 | 10 | 10 | 10 | 10 | 10 | 10 | 10 |
| ※ Vinyl chloride insulated wire (number of wires) | 20 | 20 | 20 | 20 | 20 | 20 | 20 | 20 | 20 |

TABLE 3

| | Example 8 | Example 9 | Example 10 | Comparative example 7 | Comparative example 8 | Comparative example 9 |
|---|---|---|---|---|---|---|
| (A) Non-crosslinked base resin | | | | | | |
| (a1) E150GK | 100 | 100 | 100 | 100 | 100 | 100 |
| (B) Metallic hydrate | | | | | | |
| (b1) MAGNIFIN H10 | 70 | 70 | 70 | 70 | 70 | 70 |
| (C) Hindered phenolic antioxidant | | | | | | |
| (c1) Irganox 1010 | 0.5 | 5 | 10 | | 0.1 | 15 |
| (D) Sulfurous antioxidant | | | | | | |
| (d1) NOCRAC MB | 5 | 5 | 5 | 5 | 5 | 5 |
| (E) Metallic oxide | | | | | | |
| (e1) Zinc Oxide JIS2 | 5 | 5 | 5 | 5 | 5 | 5 |
| Other ingredients | | | | | | |
| (x1) Tuftec H1041 | 10 | 10 | 10 | 10 | 10 | 10 |
| (y1) Irganox MD1024 | 1 | 1 | 1 | 1 | 1 | 1 |
| Flame retardancy | passed | passed | passed | passed | passed | passed |
| Tensile elongation (%) | 600 | 580 | 480 | 610 | 590 | 460 |
| Tensile strength (MPa) | 40 | 38 | 32 | 41 | 39 | 30 |
| Wear resistance (number of times) | 1000 | 1300 | 1500 | 1100 | 1150 | 1600 |
| Flexibility | passed | passed | passed | passed | passed | passed |
| Workability | passed | passed | passed | passed | passed | passed |
| Heat resistance A | passed | passed | passed | failed | failed | passed |
| Heat resistance B (※) | passed | passed | passed | failed | failed | passed |
| Presence/absence of bleed | absent | absent | absent | absent | absent | present |
| ※ Non-halogenous insulated wire (number of wires) | 10 | 10 | 10 | 10 | 10 | 10 |
| ※ Vinyl chloride insulated wire (number of wires) | 20 | 20 | 20 | 20 | 20 | 20 |

TABLE 4

| | Example 11 | Example 12 | Example 13 | Example 14 | Example 15 | Example 16 |
|---|---|---|---|---|---|---|
| (A) Non-crosslinked base resin | | | | | | |
| (a1) E150GK | 100 | 100 | 100 | 100 | | |
| (a2) BC8A | | | | | 100 | 100 |
| (B) Metallic hydrate | | | | | | |
| (b1) MAGNIFIN H10 | 70 | 70 | 70 | 70 | 70 | 70 |
| (C) Hindered phenolic antioxidant | | | | | | |
| (c1) Irganox 1010 | 3 | 3 | 3 | 3 | 3 | 3 |
| (D) Sulfurous antioxidant | | | | | | |
| (d1) NOCRAC MB | 5 | 5 | | | 5 | 5 |
| (d2) NOCRAC MMB | | | 5 | | | |
| (d3) NOCRAC MBZ | | | | 5 | | |
| (E) Metallic oxide | | | | | | |
| (e1) Zinc Oxide JIS2 | 5 | 5 | 5 | 5 | 5 | 5 |
| Other ingredients | | | | | | |
| (x1) Tuftec H1041 | | 10 | 10 | 10 | | |
| (x3) HPR VR103 | | | | | 10 | 10 |
| (y1) Irganox MD1024 | 1 | 1 | 1 | 1 | 1 | 1 |
| Flame retardancy | passed | passed | passed | passed | passed | passed |
| Tensile elongation (%) | 500 | 600 | 610 | 590 | 580 | 580 |
| Tensile strength (MPa) | 30 | 40 | 42 | 39 | 30 | 30 |

TABLE 4-continued

| | | | | | | |
|---|---|---|---|---|---|---|
| Wear resistance (number of times) | 600 | 1000 | 1100 | 900 | 800 | 800 |
| Flexibility | passed | passed | passed | passed | passed | passed |
| Workability | passed | passed | passed | passed | passed | passed |
| Heat resistance A | passed | passed | passed | passed | passed | passed |
| Heat resistance B (※) | passed | passed | passed | passed | passed | passed |
| ※ Non-halogenous insulated wire (number of wires) | 10 | 5 | 10 | 10 | 10 | 5 |
| ※ Vinyl chloride insulated wire (number of wires) | 20 | 20 | 20 | 20 | 20 | 20 |

| | Example 17 | Example 18 | Comparative example 10 | Comparative example 11 | Comparative example 12 |
|---|---|---|---|---|---|
| (A) Non-crosslinked base resin | | | | | |
| (a1) E150GK | 100 | 100 | 100 | 100 | 100 |
| (a2) BC8A | | | | | |
| (B) Metallic hydrate | | | | | |
| (b1) MAGNIFIN H10 | 70 | 70 | 70 | 70 | 70 |
| (C) Hindered phenolic antioxidant | | | | | |
| (c1) Irganox 1010 | 3 | 3 | 3 | 3 | 3 |
| (D) Sulfurous antioxidant | | | | | |
| (d1) NOCRAC MB | 0.5 | 20 | | 0.1 | 25 |
| (d2) NOCRAC MMB | | | | | |
| (d3) NOCRAC MBZ | | | | | |
| (E) Metallic oxide | | | | | |
| (e1) Zinc Oxide JIS2 | 5 | 5 | 5 | 5 | 5 |
| Other ingredients | | | | | |
| (x1) Tuftec H1041 | 10 | 10 | 10 | 10 | 10 |
| (x3) HPR VR103 | | | | | |
| (y1) Irganox MD1024 | 1 | 1 | 1 | 1 | 1 |
| Flame retardancy | passed | passed | passed | passed | passed |
| Tensile elongation (%) | 620 | 350 | 625 | 630 | 85 |
| Tensile strength (MPa) | 38 | 20 | 37 | 38 | 17 |
| Wear resistance (number of times) | 1100 | 400 | 1150 | 1200 | 350 |
| Flexibility | passed | passed | passed | passed | passed |
| Workability | passed | passed | passed | passed | passed |
| Heat resistance A | passed | passed | failed | failed | passed |
| Heat resistance B (※) | passed | passed | failed | failed | failed |
| ※ Non-halogenous insulated wire (number of wires) | 10 | 10 | 10 | 10 | 10 |
| ※ Vinyl chloride insulated wire (number of wires) | 20 | 20 | 20 | 20 | 20 |

TABLE 5

| | Example 19 | Example 20 | Comparative example 13 | Comparative example 14 | Comparative example 15 |
|---|---|---|---|---|---|
| (A) Non-crosslinked base resin | | | | | |
| (a1) E150GK | 100 | 100 | 100 | 100 | 100 |
| (B) Metallic hydrate | | | | | |
| (b1) MAGNIFIN H10 | 70 | 70 | 70 | 70 | 70 |
| (C) Hindered phenolic antioxidant | | | | | |
| (c1) Irganox 1010 | 3 | 3 | 3 | 3 | 3 |
| (D) Sulfurous antioxidant | | | | | |
| (d1) NOCRAC MB | 5 | 5 | 5 | 5 | 5 |

TABLE 5-continued

| | Example 19 | Example 20 | Comparative example 13 | Comparative example 14 | Comparative example 15 |
|---|---|---|---|---|---|
| (E) Metallic oxide | | | | | |
| (e1) Zinc Oxide JIS2 | 0.5 | 20 | | 0.1 | 25 |
| Other ingredients | | | | | |
| (x1) Tuftec H1041 | 10 | 10 | 10 | 10 | 10 |
| (y1) Irganox MD1024 | 1 | 1 | 1 | 1 | 1 |
| Flame retardancy | passed | passed | passed | passed | passed |
| Tensile elongation (%) | 610 | 350 | 610 | 620 | 250 |
| Tensile strength (MPa) | 42 | 25 | 41 | 42 | 20 |
| Wear resistance (number of times) | 1100 | 800 | 1100 | 1150 | 400 |
| Flexibility | passed | passed | passed | passed | passed |
| Workability | passed | passed | passed | passed | failed |
| Heat resistance A | passed | passed | failed | failed | passed |
| Heat resistance B (※) | passed | passed | failed | failed | passed |
| ※ Non-halogenous insulated wire (number of wires) | 10 | 10 | 10 | 10 | 10 |
| ※ Vinyl chloride insulated wire (number of wires) | 20 | 20 | 20 | 20 | 20 |

It was shown that the non-crosslinked flame-retardant resin compositions consistent with one embodiment of the present invention respectively possess not only sufficient flame retardancy, mechanical properties such as tensile elongation, tensile strength and wear resistance, flexibility and workability, but also deliver sufficient heat resistance over a long period of time without causing deterioration to the insulated covering materials even when the resin compositions are used in the wiring harnesses as the insulated covering materials which cover the mixture of non-halogenous insulated wires and vinyl chloride insulated wires.

The invention claimed is:

1. A non-crosslinked flame-retardant resin composition comprising:

(A) a non-crosslinked base resin which includes a propylene resin containing 50 wt % or more of propylene monomer:

(B) a metallic hydrate;

(C) a hindered phenolic antioxidant;

(D) a sulfurous antioxidant; and (E) a metallic oxide, wherein (D) the sulfurous antioxidant is an imidazole compound including an atom of sulfur (S).

2. The non-crosslinked flame-retardant resin composition according to claim 1, wherein 100 part weight of (A) the non-crosslinked base resin contains:

30-200 part weight of (B) the metallic hydrate;

0.5-10 part weight of (C) the hindered phenolic antioxidant;

0.5-20 part weight of (D) the sulfurous antioxidant; and 0.5-20 part weight of (E) the metallic oxide.

3. The non-crosslinked flame-retardant resin composition according to claim 1, wherein (E) the metallic oxide is an oxide of at least one metal selected from zinc (Zn), aluminum (Al), magnesium (Mg), lead (Pb) and tin (Sn).

4. The non-crosslinked flame-retardant resin composition according to claim 1, wherein (B) the metallic hydrate is one of magnesium hydroxide and aluminum hydroxide.

5. A non-halogenous insulated wire comprising a conductor covered with the non-crosslinked flame-retardant resin composition according to claim 1.

6. A wiring harness comprising:

one of a single wire bundle consisting only of the non-halogenous insulated wires according to claim 5, and a mixed wire bundle consisting at least of the non-halogenous insulated wires according to claim 5 and vinyl chloride insulated wires; and a wiring-harness protective material for covering the wire bundle, in which one of a non-halogenous resin composition, a vinyl chloride resin composition, and a halogenous resin composition other than the vinyl chloride resin composition is used as a base material.

7. The non-crosslinked flame-retardant resin composition according to claim 2, wherein (E) the metallic oxide is an oxide of at least one metal selected from zinc (Zn), aluminum (Al), magnesium (Mg), lead (Pb) and tin (Sn).

8. The non-crosslinked flame-retardant resin composition according to claim 2, wherein (B) the metallic hydrate is one of magnesium hydroxide and aluminum hydroxide.

9. The non-crosslinked flame-retardant resin composition according to claim 3, wherein (B) the metallic hydrate is one of magnesium hydroxide and aluminum hydroxide.

10. A non-halogenous insulated wire comprising a conductor covered with the non-crosslinked flame-retardant resin composition according to claim 2.

11. A non-halogenous insulated wire comprising a conductor covered with the non-crosslinked flame-retardant resin composition according to claim 3.

12. A non-halogenous insulated wire comprising a conductor covered with the non-crosslinked flame-retardant resin composition according to claim 4.

13. The non-crosslinked flame-retardant resin composition according to claim 1, wherein (D) the sulfurous antioxidant which is the imidazole compound including an atom of sulfur (S) is at least one selected from the group consisting of 2-mercaptobenzimidazole, 2-mercaptomethylbenzimidazole, 4-mercaptomethylbenzimidazole, 5-mercaptomethylbenzimidazole, and a zinc salt thereof.

* * * * *